Nov. 4, 1958 C. D. MAURER 2,859,275

SYSTEM FOR RECORDING TELEVISION IMAGES ON FILM

Filed April 2, 1951 2 Sheets-Sheet 1

Inventor:
Carl D. Maurer
by his Attorneys,
Darby & Darby

SYSTEM FOR RECORDING TELEVISION IMAGES ON FILM

Filed April 2, 1951 2 Sheets-Sheet 2

Inventor
Carl D. Maurer
by his Attorneys.
Darby & Darby

United States Patent Office 2,859,275

Patented Nov. 4, 1958

2,859,275

SYSTEM FOR RECORDING TELEVISION IMAGES ON FILM

Carl D. Maurer, North Hollywood, Calif., assignor to Paramount Pictures Corporation, New York, N. Y., a corporation of New York Application April 2, 1951, Serial No. 218,710

12 Claims. (Cl. 178—7.4)

Figure 1:
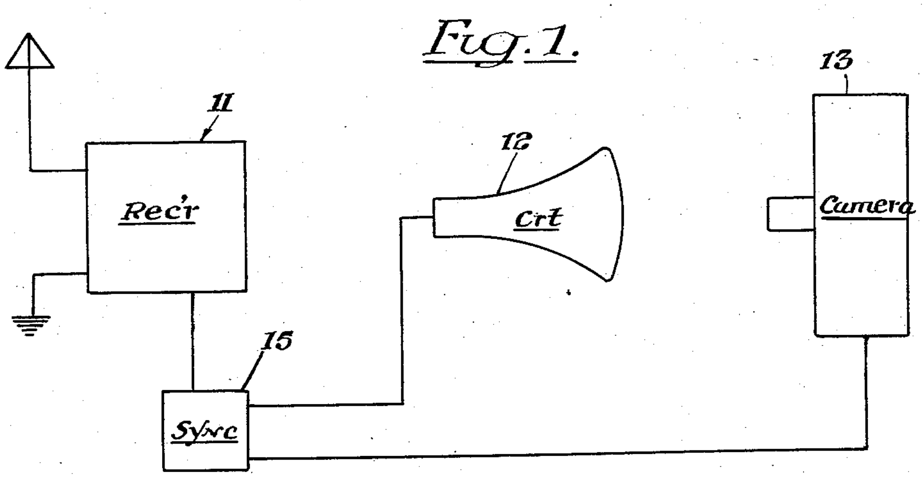

This invention relates to apparatus and method for recording television images on motion picture film.

The standard frame frequency in motion picture operation is 24 cycles per second. In accordance with present standards established by the Federal Communications Commission, television images are reproduced at 30 frames per second. An all electronic system has been proposed which may be termed an electronic shutter for synchronizing the blanking of the television image in the cathode ray tube with film movement, by counting the synchronizing pulses available in the television receiver and utilizing these pulses to control circuits for periodically blanking the tube in synchronization with film movement. In accordance with the system synchronizing pulses corresponding to the number in a complete television frame are counted at a 24 cycle rate to produce triggering pulses occurring at the motion picture frame rate. The synchronizing pulses pass through a gating circuit which, operating at the 24 cycle rate, pass a number of pulses corresponding to a complete television frame. The operation of the gating circuit is controlled by a triggering circuit which, in turn, is controlled by a frequency divider circuit operating at 24 cycles per second as a result of counting down the synchronizing pulses available in a television receiver.

The present invention represents a modification of the system described. In accordance with the invention the gating circuit is controlled by a pulse produced by suitable means connected to the camera intermittent. Thus movement of the film in the camera is synchronized with the gating circuit by virtue of the pulse produced by operating the intermittent mechanism. In this way the object of the invention of obtaining synchronization between reproduction of the television image on the cathode ray tube and film movement in the camera is accomplished.

Figure 2:
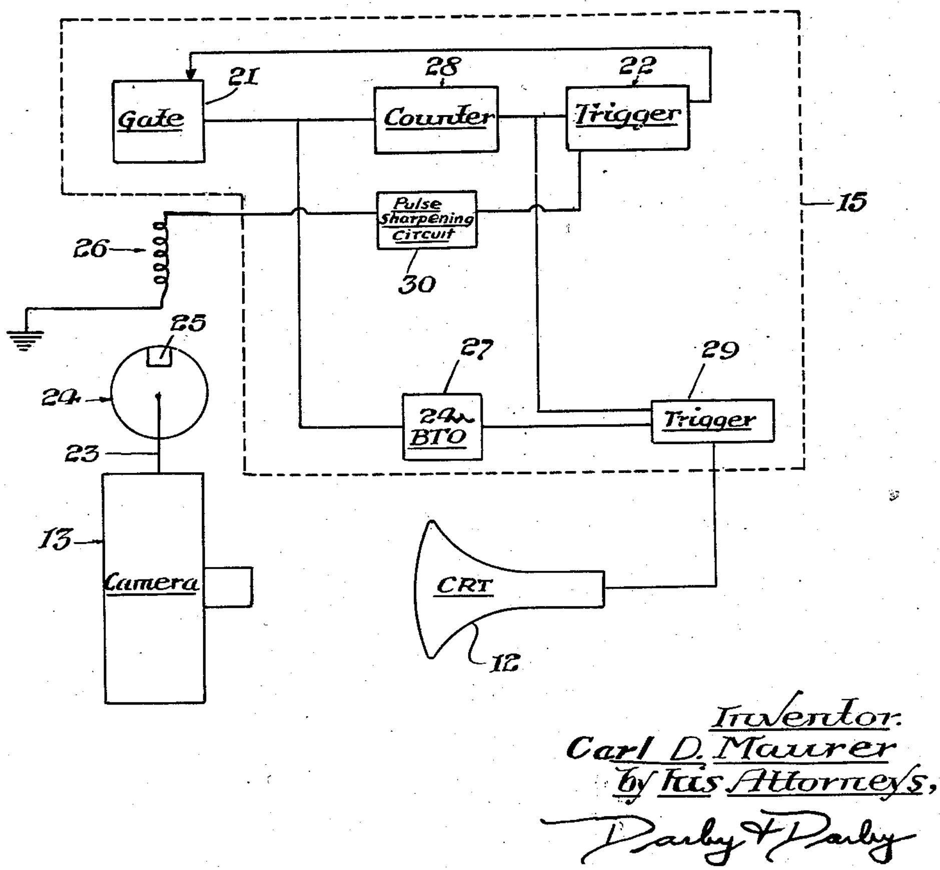
Figure 3:
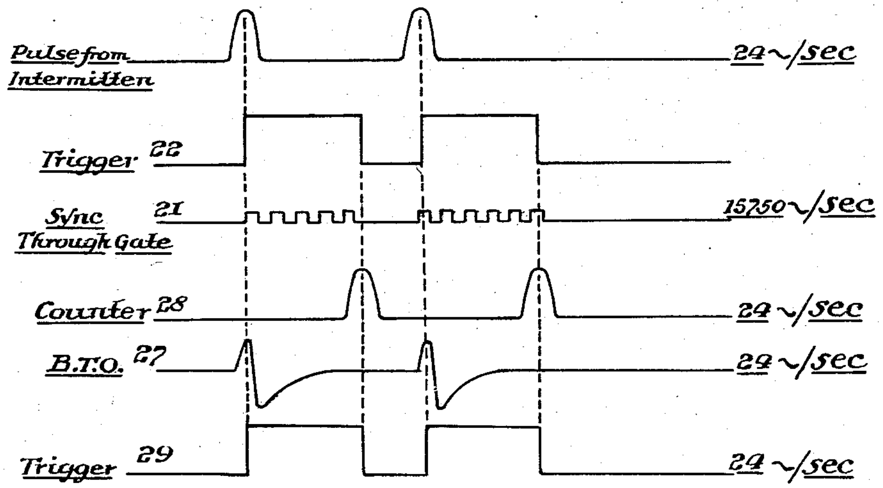
Figure 4:
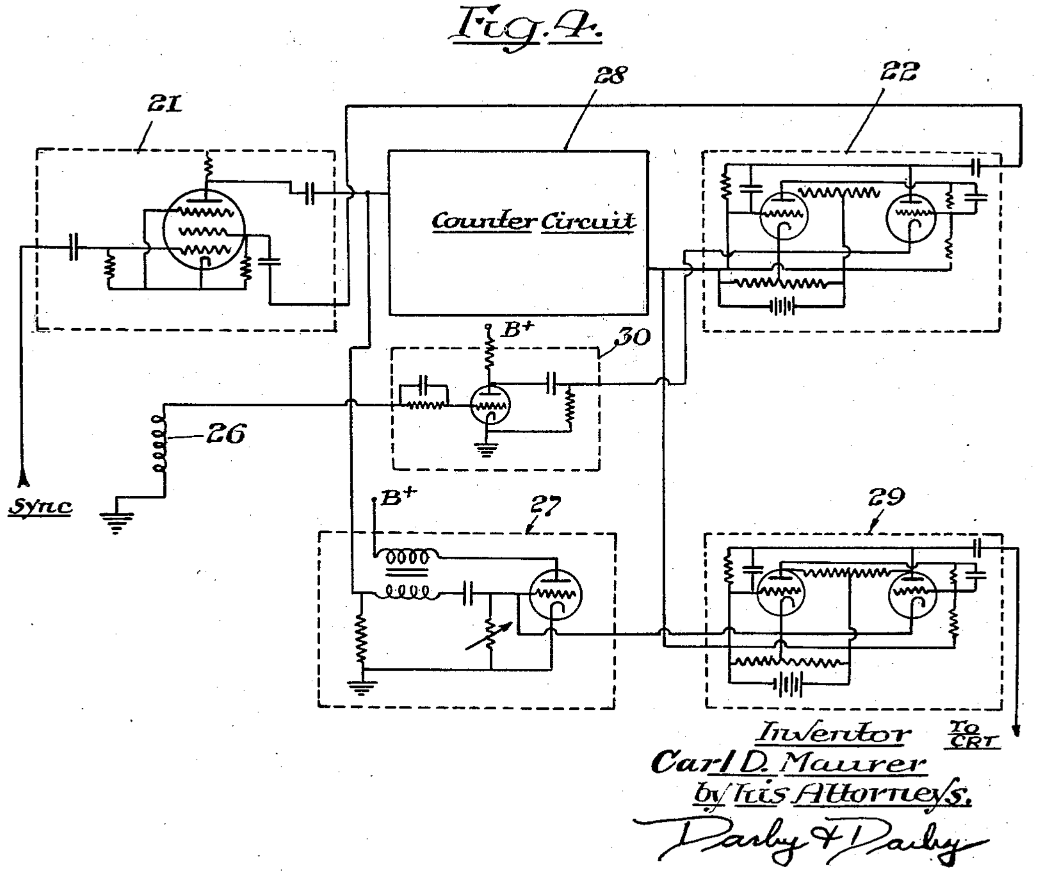

In the drawings:

Figure 1 shows, in block diagram form, apparatus for recording television images onto a motion picture film;

Figure 2, also in block diagram form, is a more detained showing of the synchronizing control portion shown in Figure 1;

Figure 3 shows the various pulse wave forms, and their respective relation in time, from the various circuits shown in Figure 2; and Figure 4 shows, primarily in circuit diagram form, components shown in block form in Figure 2.

The invention will be described for purpose of illustration as applied to present television standards as established by the Federal Communications Commission, in which television circuits are transmitted at a frame rate of 30 cycles per second, or a field rate of 60 cycles per second, each frame comprising 525 lines. Horizontal synchronizing pulses occur at a frequency of 15,750 pulses per second. It will be apparent, however, that the system disclosed herein is equally as applicable to other television standards such as, for instance, different numbers of lines per frame or different frames or fields per second.

Referring now to Figure 1 there is shown a television receiver 11 operable to reproduce television signals on an associated cathode ray tube 12. The signals produced by cathode ray tube 12 are photographed on a film operated by the camera 13. As pointed out previously, television signals on the cathode ray tube 12 are produced at 30 frames per second, whereas the film in the camera 13 operates at 24 frames per second.

In addition to the usual blanking and synchronizing circuits in the receiver 11 for controlling the signal produced on the cathode ray tube 12, there is provided, in accordance with this invention, an additional synchronizing control circuit 15 which, operated by the synchronizing signals received by the receiver 11, periodically blanks out the complete television picture produced by the cathode ray tube 12 at a rate of 24 cycles per second. This blanking occurs in synchronization with the movement of the film in the camera 13.

The components comprising the synchronizing control circuit 15 of Figure 1 are shown in more detail in Figure 2. The synchronizing pulses from the receiver are fed to a gating circuit 21 of any well known type. A typical gating circuit 21 is shown in schematic form in Figure 4. These synchronizing pulses occur at the horizontal frequency rate of 15,750 pulses per second. The gating circuit 21 is controlled by a trigger circuit 22 to pass 525 pulses and then cut off to block further signals until again triggered on to permit additional pulses to pass. This operation of the gating circuit 21 by the trigger circuit 22 occurs at a rate of 24 cycles per second.

The trigger circuit 22 is in itself well known and may be any suitable multivibrator type circuit operating in one steady state condition as a result of having been triggered by a single triggering pulse and then triggered into a second state by a second triggering pulse. A typical circuit 22 is shown in schematic form in Figure 4. The output of the trigger circuit 22 in one state applies a pulse of proper polarity to block the gating circuit 21 to prevent synchronizing pulses from passing therethrough. A second control pulse applied to the trigger circuit 22 reverses its operating state to apply a pulse of opposite polarity to the gating circuit 21. Such a pulse in accordance with the present application is derived from the camera intermittent mechanism.

This camera intermittent mechanism rotates once per camera cycle through well known shafts and reduction gears driven by a suitable motor. An extension of the driving shaft 23 has on the end thereof a disc or wheel 24 of non-magnetic material. A small permanent magnet 25 is embedded in the edge thereof so as to rotate as driven by the intermittent, once per camera cycle. A coil of wire 26 is positioned close to the edge of the wheel 24. The coil 26 is connected through a suitable pulse sharpening circuit 30 to one of the input terminals of the trigger circuit 22, while the other end of the coil 26 may be connected to ground. As the disc 24 rotates, magnetic flux passes through the coil as the magnet 25 sweeps by. The magnetic flux in the coil 26 generates pulses of electrical potential in accordance with well known principles. These pulses from the coil 26 operate, after sharpening, to trigger the trigger circuit 22.

It will be apparent that instead of a magnet and coil arrangement the disc 24 may have an electrical conductor embedded in one segment thereof. A complementary electrical contact member may be positioned adjacent to and touching the edge of the disc. As the segment rotates, electrical contact is made to produce a pulse which may be applied to the trigger circuit 22 in the same manner as the magnetic pulse is applied thereto.

As circuit 22 in triggered reversing its state of operation, the gating circuit 21 is opened permitting synchronizing pulses to pass therethrough. Pulses passing by the gating circuit 21 are applied to a blocking tube oscillator 27 operating at 24 cycles per second, and also to a counter circuit 28.

The blocking tube oscillator 27 may be any well known type, the typical circuit of which is shown in schematic form in Figure 4. The circuit constants are chosen in accordance with well known principles so that the oscillator operates at 24 cycles per second, triggered by an input pulse. The first synchronizing pulse passed by the gating circuit 21 and applied to the blocking tube oscillator 27 triggers the oscillator 27 to produce a pulse repeated at the 24 cycle rate.

The pulse output from the blocking tube oscillator 27 is applied to a second triggering circuit 29. This latter triggering circuit 29 may be of the same type as the trigger circuit 22 described above, and a circuit diagram thereof is shown in Figure 4. The trigger circuit 29 having two states of operation, is connected to the cathode ray tube to bias an electrode thereof and block or cut off the cathode ray tube to prevent the presentation of images thereon. In a second state the pulse from the trigger circuit 29 permits the cathode ray tube to operate in the normal manner for the reproduction of images. As the pulse from the blocking tube oscillator 27 is applied to the trigger circuit 29, its state of operation is reversed to apply a pulse to the cathode ray tube which will permit the tube to reproduce television signals applied thereto.

Thus the start of reproduction of the television images by the cathode ray tube 12 occurs in synchronism with the passing of the first synchronizing pulse by the gating circuit 21. Since the blocking tube oscillator 27 operates at 24 cycles per second the reproduction of television images by the tube 12 likewise will occur at 24 cycles per second.

As pointed out previously, 525 pulses are passed by the gating circuit 21. These pulses are applied to the counter circuit 28 as mentioned previously. The counter circuit 28 counts the number of synchronizing pulses and produces a single output pulse at the end of 525 input pulses. Any suitable well known type of counter circuit may be used for this purpose. One such circuit is described in the July 1945 issue of Electronic Industries.

The counter circuit is connected to the trigger circuit 22 and also to the trigger circuit 29. A single output pulse from the counter circuit 28 occurring at the end of 525 horizontal synchronizing pulses of the television signal operates to reverse the state of each of the two triggering circuits 22 and 29. The first trigger circuit 22, which has been permitting pulses to pass through the gating circuit 21, is reversed to apply a pulse of opposite polarity to the gating circuit 21 so as to block the passing of further synchronizing pulses. The second trigger circuit 29 is reversed to apply a pulse of suitable polarity to the cathode ray tube 12 and prevent the further reproduction of television signals thereby.

Thus, during the time that 525 pulses have been counted by the counter circuit 28 a complete television frame is reproduced by the cathode ray tube 12. The passing of these horizontal synchronizing pulses by the gating circuit 21 is controlled by the pulse produced by the coil 26, and this presentation of a complete television frame image on the tube 12 occurs during the time that the film in the camera 13 is stationary. At the end of the 525 lines the pulse produced by the counter circuit 28 operates to cut off the gating circuit 21 through the triggering circuit 22 and at the same time to cut off the television signals on the tube 12 through the trigger circuit 29. These periods of cut off occur during the film movement in the camera 13. At the end of film movement the magnetic pulse through coil 26 operates on trigger 22 to open the gating circuit 21 and repeat the cycle for the reproduction of a second frame image.

The timing of the various pulses from each of the circuits described may be seen by referring to Figure 3. It will be apparent that the positioning of the magnet 25 in the edge of the disc 24 is important from the phasing standpoint in order that the pulse created by the intermittent will occur at the end of film pull-down or movement. This phasing is readily accomplished by positioning the magnet 25 a predetermined angular position in the disc 24, or, in like manner, positioning the magnet 25 angularly by means of the connection of the disc 24 on the shaft 23. Well known principles may be used to provide proper phasing.

As is well understood by those skilled in the art, such electronic blanking as described above makes desirable that the cathode ray tube 13 have a fluorescent screen having a short persistence characteristic.

While particular preferred circuits have been shown and described it will be apparent to those skilled in the art that other circuits or components may be used and modifications may be made without departing from the scope of the invention.

What is claimed is:

1. Apparatus for recording a television image on a motion picture film operated at a predetermined frame rate comprising a motion picture camera, and a television receiver, means for blanking the image reproduced by said receiver, a counter circuit connected to said means and to said receiver and activated by the synchronizing pulses received thereby to produce a single pulse for a plurality of synchronizing pulses constituting a complete television frame, means actuated by said camera to produce a pulse in synchronism with film movement therein at motion picture frame rate, and a pulse generating circuit connected to said latter means for producing pulses at said picture frame rate, said pulse circuit being connected to control the recurrent cycle of said counter circuit whereby said image is blanked at said motion picture frame rate.

2. Apparatus for recording television images on a motion picture film operating at a predetermined frame rate comprising a camera and a television receiver having a cathode ray tube for reproducing said images, an electronic counter circuit connected to said receiver and activated by the synchronizing pulses received thereby to produce a single pulse for a plurality of synchronizing pulses constituting a complete television frame, means actuated by said camera for producing a pulse in synchronism with the movement of film therein, a pulse circuit connected to said means to be triggered thereby and generate pulses at said predetermined frame rate, said pulse circuit being connected also to control the recurrent cycle of said counter circuit, and an electronic pulse generator connected to said counter circuit and activated by the output therefrom and also connected to said cathode ray tube to produce a signal for blanking out the television image on said tube periodically at said motion picture frame rate.

3. Apparatus for recording television images on to a motion picture film, comprising a camera, a television receiver, means for blanking the image reproduced by said receiver, a counter circuit connected to said means and to said receiver and activated by the synchronizing pulses received thereby to produce a single pulse for a plurality of synchronizing pulses constituting a complete television frame, means actuated by said camera to produce a pulse in synchronism with film movement therein, and gating means controlled by said latter means, said gating means being connected to pass said synchronizing pulses to said counter circuit in groups recurring at motion picture frame rate.

4. Apparatus for recording television images on to a motion picture film, comprising a camera, a pulse generator operated by said camera, means for initiating the presentation of said television images, said means being connected to be controlled by said generated pulse, means controlled by the television synchronizing pulses for terminating said presentation after a time interval corresponding to a complete television frame, and means controlled by said generator to pass said synchronizing pulses to said terminating means.

5. Apparatus for recording received television images displayed on a cathode ray tube on to a motion picture film, comprising a camera, a generator of electrical pulses activated by said camera for generating said pulses at the end of each film movement therein, means actuated by said pulses for initiating the presentation of said television images on said tube, means controlled by the television synchronizing signals for terminating said presentation after a time corresponding to a complete television frame, and means controlled by said generator to pass said synchronizing pulses to said terminating means.

6. In a system for recording a television image on to a motion picture film, apparatus comprising a television receiver, means for blanking out the image produced by said receiver, a first pulse generating circuit connected to said receiver and activated by the first of a series of pulses equal in number to the synchronizing pulses constituting a television frame received by said receiver, a second pulse generating circuit connected to said receiver and producing a pulse at the time of the last of the said series of pulses, a camera for said film, and a third pulse generating circuit activated by said camera and connected to said second pulse circuit to control the timing of the operation thereof.

7. Apparatus for recording a television image on to a motion picture film operating at a predetermined frame frequency, comprising a television receiver having a cathode ray tube, a gating circuit connected to said receiver for selecting a portion of the horizontal synchronizing pulses received thereby, a pulse counter circuit connected to said gating circuit for generating a single pulse after a plurality of pulses constituting a television picture frame, a second pulse producing circuit connected to and activated by the television synchronizing pulses passed by said gating circuit for producing pulses at a frequency equal to the frame frequency of said motion picture film, a trigger circuit connected to said tube and also connected to and controlled by said pulse counter circuit and said second pulse producing circuit, said trigger circuit generating pulses for periodically blanking out the image produced by said cathode ray tube, a second trigger circuit connected to and activating said gating circuit, a camera for said film, a third pulse generating circuit activated by said camera and connected to control said second trigger circuit, whereby said counter circuit has a recurrent rate of operation corresponding to the frame frequency of operation of said camera.

8. An apparatus for recording received television images in which the images displayed on a cathode ray tube screen are projected on a sensitized film strip comprising, a camera including an intermittent periodically advancing said film strip, a signal generator operated by said camera intermittent generating a signal of short time duration immediately succeeding the operation of the intermittent in advancing the film strip, means controlled by said generated signal for initiating the illumination of the cathode ray tube screen and means controlled by the received television horizontal synchronizing signals for terminating such illumination after a time interval corresponding to the time required to receive one complete television picture.

9. An apparatus for recording received television images in which the images displayed on a cathode ray tube screen are projected on a sensitized film strip comprising, a camera including an intermittent periodically advancing said film strip, counter means controlled by the received television horizontal synchronizing signals for terminating the illumination on a cathode ray screen after such a number of successive horizontal synchronizing signals have been impressed thereon as are contained in one complete television picture, a signal generator operated by said camera intermittent generating a signal immediately succeeding the operation of the intermittent in advancing the film strip and means controlled by said generated signal for initiating the illumination of the cathode ray tube screen and for initiating the operation of the counting means.

10. An apparatus for recording received television images in which the images displayed on a cathode ray tube screen are projected on a sensitized film strip comprising, a counting circuit controlled by successive received television horizontal synchronizing signals impressed thereon to count such number of said signals as are contained in one television picture and producing an output pulse at the termination of said counting operation, a camera including an intermittent periodically advancing said film strip, a signal generator operated by said camera intermittent generating a signal of short duration immediately succeeding the operation of the intermittent in advancing the film strip, means operated by said signal of short duration for initiating said counting operation and for illuminating the cathode ray tube screen and means controlled by the output pulse produced at the termination of said counting period for darkening said screen and for preventing the impression of horizontal synchronizing signals on said counting circuit.

11. An apparatus for recording received television images in which the images displayed on a cathode ray tube screen are projected on a sensitized film strip comprising: a camera including an intermittent for periodically advancing said film strip and an intermittent control mechanism, a signal generator operated by said camera intermittent control mechanism for generating a signal of short time duration immediately succeeding the operation of the intermittent in advancing the film strip, means controlled by said generated signal for initiating the illumination of the cathode ray tube screen, and means controlled by received television horizontal synchronizing signals for terminating such illumination after a time interval corresponding to the time required to receive one complete television picture.

12. A system for recording a complete set of scanning lines constituting each television image of a series of produced television images, comprising means for producing the television images sequentially, means for sequentially moving successive frames of a recording medium into position to record the produced images, an electronic counter for counting a set of scanning lines constituting a complete television image, means controlled from said recording medium moving means for initiating and maintaining a counting operation of said counter, blanking means for said means for producing television images, means for controlling said blanking means to discontinue its blanking action upon initiation of a count by said counter, means controlled by said counter for operating said count maintaining means to discontinue the count, means controlled by said counter for causing said blanking means to become operative to produce blanking, and means controlled by said counter to reset the counter in readiness for a new count.

References Cited in the file of this patent

UNITED STATES PATENTS

| | | |
|---|---|---|
| 2,251,786 | Epstein | Aug. 5, 1941 |
| 2,373,114 | Goldsmith | Apr. 10, 1945 |
| 2,486,717 | Maurer | Nov. 1, 1949 |
| 2,525,891 | Garman | Oct. 17, 1950 |
| 2,565,366 | Gray | Aug. 21, 1951 |
| 2,600,868 | Hales | June 17, 1952 |
| 2,604,535 | Garman et al. | July 22, 1952 |
| 2,613,264 | Haynes | Oct. 7, 1952 |
| 2,714,131 | Gillette et al. | July 26, 1955 |